United States Patent
Johnson

(10) Patent No.: US 6,633,151 B2
(45) Date of Patent: Oct. 14, 2003

(54) ELECTRIC VEHICLE DRIVE SYSTEM

(75) Inventor: Ronald A. Johnson, Effingham, IL (US)

(73) Assignee: Eltra Systems, Inc., Effingham, IL (US)

( * ) Notice: Subject to any disclaimer, the term of this patent is extended or adjusted under 35 U.S.C. 154(b) by 51 days.

(21) Appl. No.: 09/801,581

(22) Filed: Mar. 9, 2001

(65) Prior Publication Data

US 2002/0125855 A1 Sep. 12, 2002

(51) Int. Cl.[7] .............................. H02P 5/34; H02P 1/38; G05B 11/28
(52) U.S. Cl. ..................... 318/801; 318/773; 318/599
(58) Field of Search ............................... 318/767, 771, 318/772, 727, 766, 494–498, 523–529, 531.832, 689, 700, 704, 711, 720, 724, 246, 247, 251, 252, 432–434, 773, 559, 139; 388/800, 801, 808, 809, 843, 844, 807.2

(56) References Cited

U.S. PATENT DOCUMENTS

| | | | | |
|---|---|---|---|---|
| 2,773,230 A | * | 12/1956 | Emley | 318/496 |
| 4,221,999 A | * | 9/1980 | Gausman, Jr. | 318/704 |
| 4,234,808 A | * | 11/1980 | Geppert et al. | 310/156.64 |
| 4,751,415 A | * | 6/1988 | Kitamori et al. | 310/156.01 |
| 5,012,177 A | * | 4/1991 | Dhyanchand et al. | 322/10 |
| 5,216,343 A | * | 6/1993 | Genheimer et al. | 318/111 |
| 5,294,875 A | * | 3/1994 | Reddy | 318/801 |
| 5,352,964 A | * | 10/1994 | Nakamura et al. | 318/771 |
| 5,404,089 A | * | 4/1995 | Flanagan et al. | 318/811 |
| 5,786,673 A | | 7/1998 | Johnson | |
| 6,008,616 A | * | 12/1999 | Nagayama et al. | 318/773 |
| 6,028,404 A | * | 2/2000 | Yang | 318/771 |
| 6,127,791 A | | 10/2000 | Strunk | |

* cited by examiner

Primary Examiner—Robert E. Nappi
Assistant Examiner—Patrick Miller
(74) Attorney, Agent, or Firm—Knechtel, Demeur & Samlan

(57) ABSTRACT

An electric drive system is provided to generate varying amounts of output torque supplied to a driven member over a wide range of constant revolutions per minute speeds to reduce power consumption. The electric motor includes a rotor and a stator assembly. The stator assembly is disposed around the rotor and is inductively coupled to the rotor. The stator assembly further includes a plurality of poles, each pole consisting of a plurality of split windings wound so that the magnetic fluxes generated therefrom are added. Power switching circuits are provided for energizing the partition drives of split windings on each of the stator poles. A controller is used to selectively control the frequency, pulse width modulation, and partition configuration to vary the rotational speed and torque generation supplied to the driven member.

18 Claims, 5 Drawing Sheets

CONFIGURATION #3

ELECTRIC VEHICLE DRIVE SYSTEM

I. FIELD OF THE INVENTION

The present invention relates to electric drive systems for use in electric vehicles, tractors, etc . . . and, more particularly, to an improved electric motor and driver system that includes a unique stator construction which provides on-command variable torque control at any constant revolution per minute ("RPM") and, thereby, improves motor efficiency that results from reduced power consumption and increased vehicle mileage.

II. DESCRIPTION OF THE PRIOR ART

As is generally known in the art, electric drive systems in recent years have been limited to small vehicles with a direct current (DC), an alternating current (AC) or a brushless direct current (DC) electric motor with a conventional stator winding construction that is connected through a speed control unit to a battery source. All of these conventional motors have fixed turns per coil stator windings and all of the stator windings are wired in a fixed electrical configuration to the switching circuits and the power source.

In an electric drive system for vehicles, the motor must be capable of generating a relatively high amount of torque to accelerate the vehicle. Once the vehicle reaches a constant speed, the momentum of the vehicle will reduce the torque load on the motor to a low torque level which is limited to the amount of torque that is required to overcome the aerodynamics, road resistance, and mechanical losses of the vehicle. As the conditions such as wind and terrain fluctuate, the amount of torque load on the motor required to maintain the constant speed of the vehicle will also fluctuate. To maintain a constant vehicle speed, the motor must also maintain a constant speed while encountering these major changes in torque load. These fluctuations in the torque load, however, while maintaining a constant RPM, result in a reduced motor efficiency causing problems such as excessive heat in the drive system, wasted energy, and reduced vehicle mileage.

The efficiency problems identified above are presented by state of the art electric drive systems with conventional motors that have fixed turns per coil stators. By way of illustration, FIGS. 1 and 2 graphically illustrate these efficiency problems for a conventional AC induction drive system.

FIG. 1 represents system power efficiency curves in relation to torque load and RPM of a conventional AC induction drive system. At one hundred percent (100%) torque load, the peak motor efficiency is low and the RPM range is small. Specifically, the peak motor efficiency is at approximately seventy-three percent (73%) at approximately 1700 RPM. As the torque load is reduced by one half (½) to fifty percent (50%), the peak motor efficiency will increase slightly to approximately seventy-nine percent (79%) and the operating RPM range will more than double to approximately 3600 RPM. As the torque load is reduced by another one half (½) to twenty-five percent (25%), the peak motor efficiency will continue to increase to approximately eighty-four percent (84%) and the operating RPM range will increase almost one and a half times (1½) to approximately 5800 RPM. As the torque load is reduced by another one half (½) to twelve and one-half percent (12.5%), the peak motor efficiency will continue to increase to approximately ninety percent (90%) and the operating RPM range will increase another one and one quarter times (1¼) to approximately 7200 RPM. As the torque load is reduced below ten percent (10%), however, the peak motor efficiency will decrease to approximately eighty-one percent (81%) while the operating RPM range will remain substantially the same at approximately 7200 RPM. Thus, as the torque load is reduced, the peak motor efficiency generally increases and the operating RPM generally increases substantially. Conversely, as the torque load is doubled, the peak motor efficiency generally decreases and the operating RPM will be reduced by fifty percent (50%).

FIG. 2 represents the amount of horsepower a typical direct drive vehicle might require to maintain a constant mile per hour ("MPH") speed. As illustrated, the greater the MPH and operating RPM of the vehicle, the greater the horsepower to maintain the constant speed and operating RPM of the vehicle. For example, at a constant 45 MPH, the vehicle would require approximately seven horsepower (HP) which is less than twenty percent (20%) torque load at approximately 3600 RPM. In FIG. 1, a twenty percent (20%) torque load at 3600 RPM would result in a power efficiency of approximately eighty-five percent (85%). However, to accelerate this vehicle to pass another vehicle, the torque load may double. This could cause the efficiency to drop five percent (5%) to fifteen percent (15%). This is another example of low efficiency in electric motors with fixed turns per coil stator windings.

Also, FIGS. 1 and 2 show that a constant speed of 20 MPH may require only 4 HP. This is below the ten percent (10%) torque load level and the motor efficiency could again drop five percent (5%) to fifteen percent (15%). Another problem is when the vehicle is accelerated from zero MPH, the high torque at very low RPM levels could result in the one hundred percent (100%) torque load range and motor efficiency in the sixty percent (60%) range. Anytime the efficiency drops below eighty-five percent (85%), the vehicle mileage range is reduced drastically because this energy is wasted in excess heat in the drive system.

In an electric drive vehicle, the system power is equal to the current squared times the circuit resistance in the motor or, in the equation of, Power=(Current$^2$)(Resistance). Since battery voltage in an electric drive vehicle is relatively constant, if the current is decreased, the power consumption of the motor is reduced which increases the vehicle mileage. For example, if the current is decreased by approximately twenty-five percent (25%), the corresponding reduction in power consumption can result in an increase of vehicle mileage of approximately fifty percent (50%) to one hundred percent (100%). However, for fixed turns per coil stator windings, as illustrated in FIG. 1, a reduction in torque load below ten percent (10%) results in a less efficient motor which will instead decrease the vehicle mileage.

Based upon the foregoing, the state of the art electric drive systems present a number of problems. First, fixed turns per coil stator windings cannot compensate for low efficiency conditions. As a result, power consumption is increased which ultimately reduces the mileage that the vehicle may operate on the battery source. Second, as the power consumption is increased and corresponding vehicle mileage is reduced, the vehicle requires more frequent recharging or replacement of the battery source for the vehicle to continue in operation. Such inefficiencies result in larger battery source requirements or larger hybrid generators. Lastly, the inefficiency of the drive systems present a major obstacle to the manufacturers in the development and marketability of electric drive vehicles such as passenger cars, trucks, tractors, etc . . . to the consuming public.

Thus, there is a need and there has never been disclosed the improved electric motor and driver system with a unique stator construction that enables variable torque control at constant RPM to improve motor efficiency.

III. OBJECTS OF THE INVENTION

It is the primary object of the present invention to provide an improved electric motor and drive system to control the amount of generated torque at any constant speed to significantly increase motor efficiency and reduce power consumption.

Another object of the present invention is to provide an improved electric motor which includes a unique stator construction which provides that each pole within each phase will include at least two split windings. A related object of the present invention is that when the poles within each phase are combined, the magnetic fields from all split windings within each pole will add to one another.

Another object of the present invention to provide an improved electric motor which includes a unique stator construction where each split winding in all poles and phases be wired into a partitioned wiring configuration.

Still another object of the present invention to provide an improved electric motor which includes a unique stator winding connection where each partition of split windings are independent and connected to H-bridge drivers.

It is another object of the present invention to provide an improved electric drive system where the power supply inputs to each partition having switching circuits that can switch the supply power to the partition drivers into parallel or series configurations with respect to the other partition drivers so as to effectively change the stator winding turns per coil.

Other objects of the present invention will become more apparent to persons having ordinary skill in the art to which the present invention pertains from the following description taken in conjunction with the accompanying drawings.

IV. SUMMARY OF THE INVENTION

The present invention is an electric motor that can generate variable levels of torque at any constant RPM to a driven member over a wide range of RPM speeds so as to reduce power consumption to the power source. The motor includes a rotor having an axis of rotation and a stator assembly which is disposed around the rotor and is inductively coupled to the rotor. The stator assembly has a plurality of poles with each of the stator poles in each phase consisting of at least two split windings.

The split windings within each of the stator poles and phases are wound to be essentially in phase with each other so that the magnetic flux generated in each of the stator windings will add to each other to produce an increased magnetic field strength or, in other words, as each of the split winding partitions are switched into different parallel or series combinations, the turns per coil is effectively changed resulting in a different torque efficiency curve.

A micro-processor controller is used to input the phase currents and voltage, RPM of the motor, the MPH of the vehicle, the throttle level and other necessary signals to determine the configuration of the split partitions required to achieve maximum efficiency at the current torque load in addition to standard Pulse-Width-Modulation functions.

V. BRIEF DESCRIPTION OF THE DRAWINGS

The Description of the Preferred Embodiment will be better understood with reference to the following figures.

VI. DETAILED DESCRIPTION OF THE PREFERRED EMBODIMENT

Figure 1:
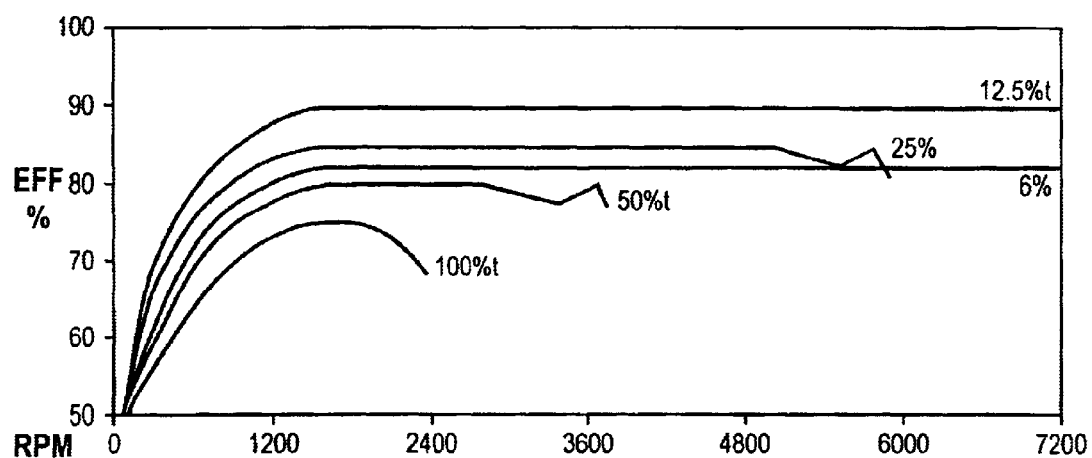
FIG. 1 is a graphical illustration of the percentage of motor efficiency at variable RPM in relation to the torque load of a conventional electric drive vehicle motor.
Figure 2:
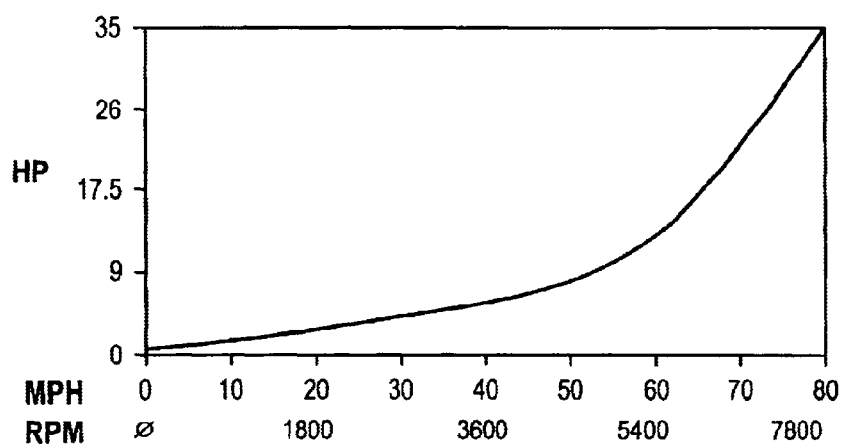
FIG. 2 is a graphical illustration of the horsepower (HP) required to maintain a constant MPH and RPM speeds of a conventional electric drive motor.
Figure 3A:
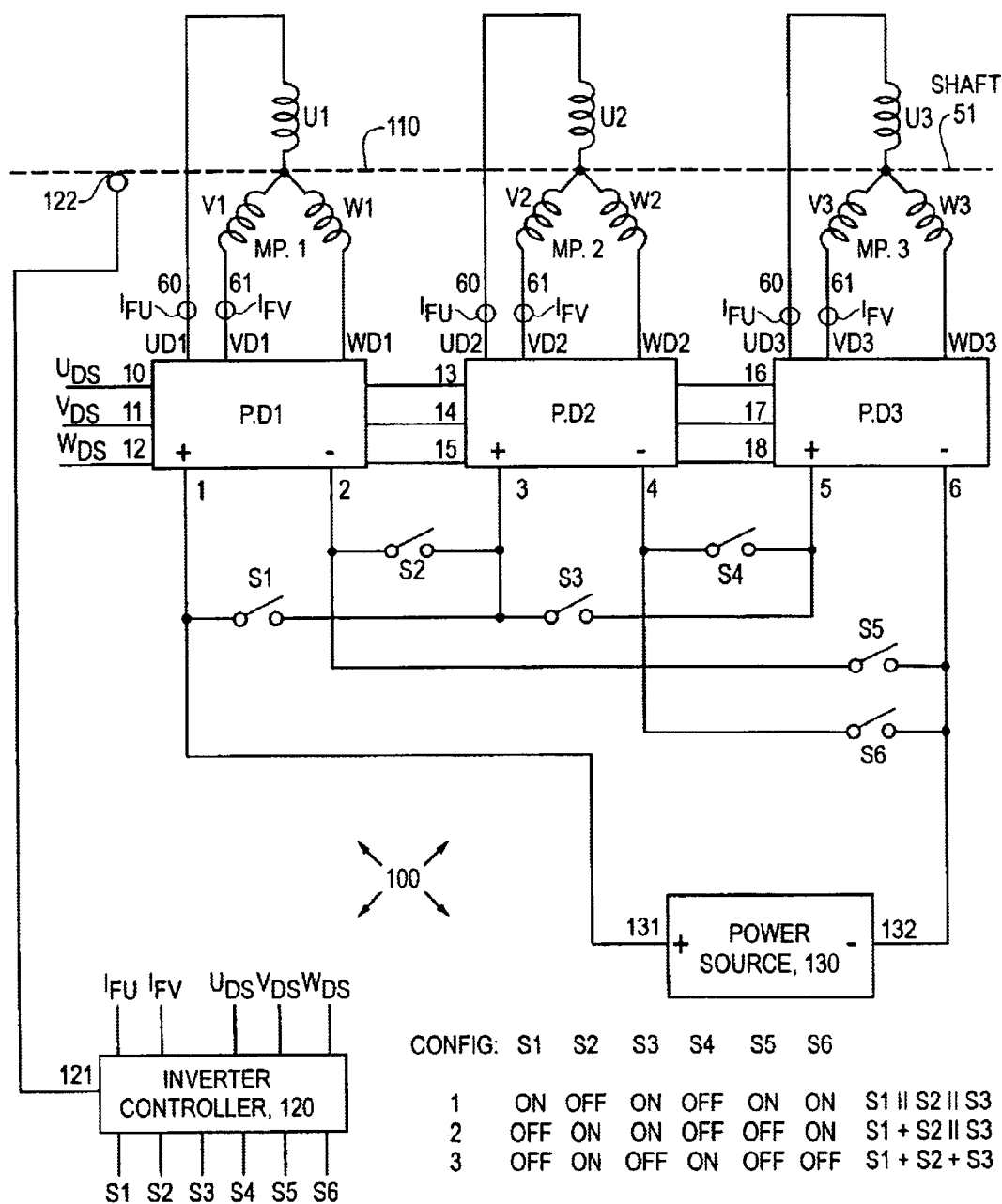
FIG. 3A is a block diagram of an apparatus for controlling efficiency at any constant speed for an electric motor, constructed in accordance with the principles of the present invention.

Turning first to FIG. 3A, there is illustrated a block diagram of an apparatus 100 for an electric motor 110 to control the torque efficiency at any vehicle speed which is constructed in accordance with the principles of the present invention. For simplicity, the block diagram is of a three (3) phase four (4) pole AC induction motor version of the apparatus. Alternatively, Applicant's invention applies to two or more poles with at least one or more phases of alternating current (AC) or a brushless direct current (DC) electric motors.

Figure 3B:
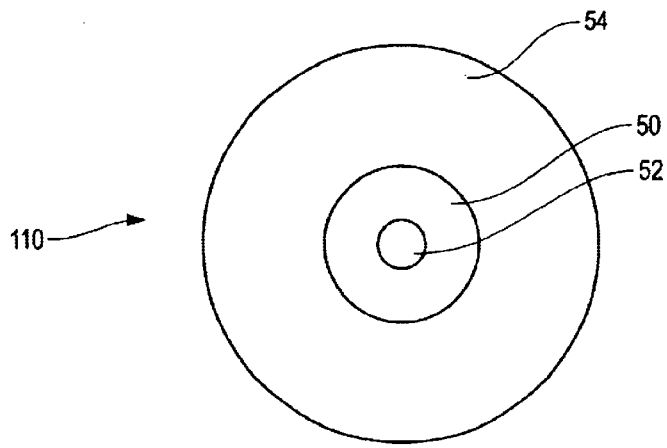
FIG. 3B is a side perspective view of the electric motor of the present invention.

As illustrated in FIG. 3B, the electric motor 110 includes a rotor 50 mounted on a shaft 52 and a stator assembly 54 having four (4) poles within each of the three (3) phases. Each pole within each phase is preferably spaced from one another around rotor 50 by ninety (90) mechanical degrees, and includes three (3) split windings. This is exemplary because the invention is applicable to a motor having two or more poles and two or more split windings within each pole. The split windings within each pole are wired into an electrical configuration with the associated split windings of similar poles for forming the partitioned drive circuits MP1, MP2, and MP3 for each of the partition drives.

Figure 4:
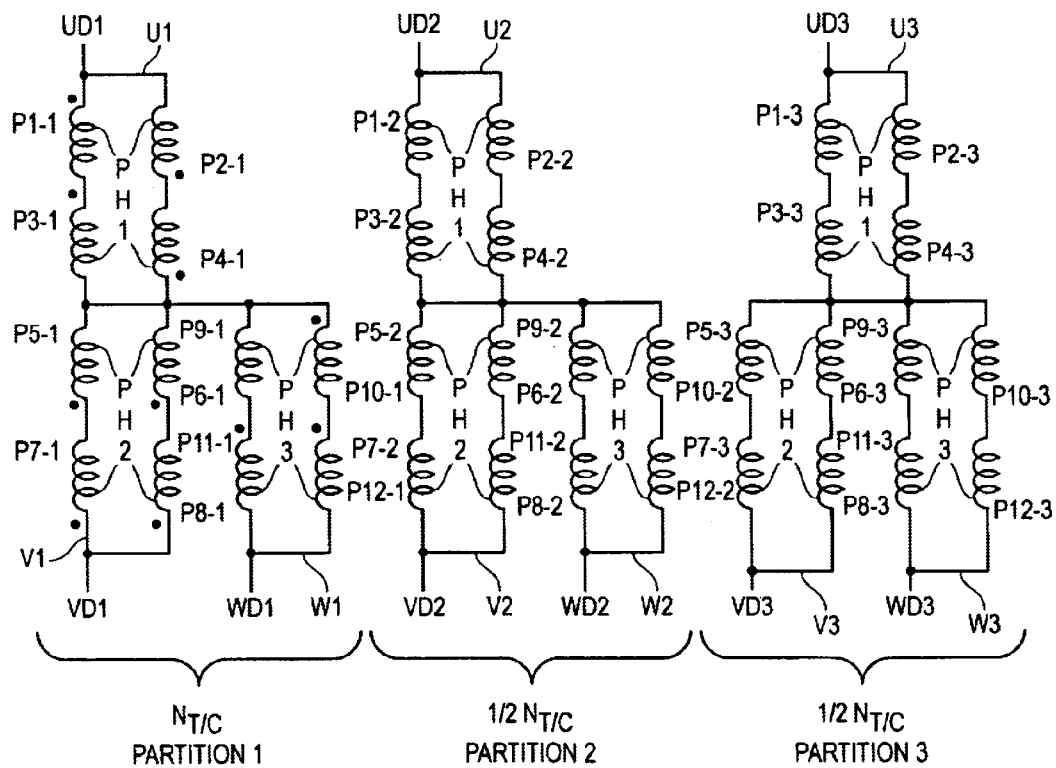
FIG. 4 is a schematic diagram of the motor windings detailing the unique stator construction of the present invention.

In the electric motor 110 of FIG. 4, used to explain the invention, all poles within each phase contain three (3) split windings that are wound within the same stator slots. With respect to Partition 1, Phase 1 PH1, pole 1 includes 3 split windings P1-1, P1-2 and P1-3. Phase 1 PH1, Pole 2 includes 3 split windings P2-1, P2-2 and P2-3. Phase 1 PH1, Pole 3 includes 3 split windings P3-1, P3-2 and P3-3. Phase 1 PH1, Pole 4 includes 3 split windings P4-1, P4-2 and P4-3. Phase 2 PH2, Pole 1 includes 3 split windings P5-1, P5-2 and P5-3. Phase 2 PH2, Pole 2 includes 3 split windings P6-1, P6-2 and P6-3. Phase 2 PH2, Pole 3 includes 3 split windings P7-1, P7-2 and P7-3. Phase 2 PH2, Pole 4 includes 3 split windings P8-1, P8-2 and P8-3. Phase 3 PH3, Pole 1 includes 3 split windings P9-1, P9-2 and P9-3. Phase 3 PH3, Pole 2 includes 3 split windings P10-1, P10-2 and P10-3. Phase 3 PH3, Pole 3 includes 3 split windings P11-1, P11-2 and P11-3. Phase 1 PH3, Pole 4 includes 3 split windings P12-1, P12-2 and P12-3.

Also shown in FIG. 4, Partition 1 contains Phase 1 U1 windings P1-1, P2-1, P3-1 and P4-1 in a series/parallel configuration determined by the desired phase drive voltage. Partition 1 also contains Phase 2 V1 windings P5-1, P6-1, P7-1 and P8-1 and Phase 3 W1 windings P9-1, P10-1, P11-1 and P12-1 wired in the same series/parallel configuration as Phase 1. In this example, Partition 1 forms a complete wye 3-phase 4-pole winding configuration with Phase 1 connected to partition drive PD1 at output UD1, Phase 2 connected to partition drive PD1 at output VD1 and Phase 3 connected to partition drive PD1 at output WD1. Partition 2 has windings P1-2 through P12-2 wired in a similar wye configuration with Phase 1 connected to partition drive PD2 at output UD2, Phase 2 connected to partition drive PD2 at output VD2 and Phase 3 connected to partition drive PD2 at output WD2. Partition 3 has windings P1-3 through P12-3 wired in a similar Y configuration with Phase 1 connected to partition drive PD3 at output UD3, Phase 2 connected to partition drive PD3 at output VD3 and Phase 3 connected to partition drive PD3 at output WD3.

Figure 8:
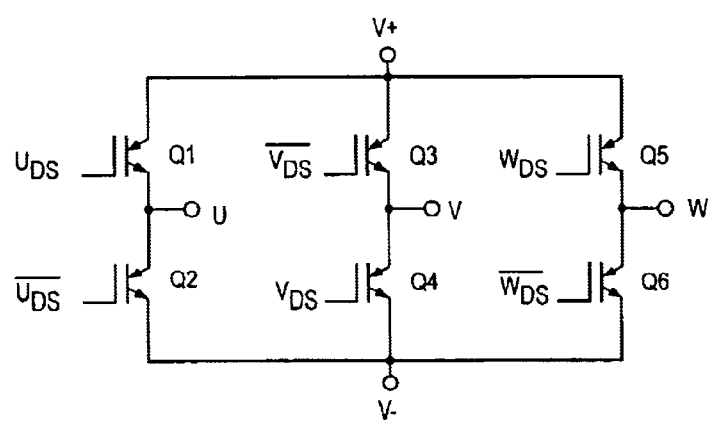
FIG. 8 is a schematic circuit diagram of the H-bridge winding drive circuits for the partition drives.

In FIG. 3A, the Partition Drive Unit 1 (PD1) is a conventional 3 phase H-bridge switching circuit gated by the 3 phase PWM data signals Uds, Vds and Wds from Controller 120. Partition Drive Unit 2 (PD2) is also a conventional 3 phase H-bridge switching circuit and is gated by the same 3 phase PWM data signals Uds, Vds and Wds from Controller 120. Partition Drive Unit 3 (PD3) is also a conventional 3 phase H-bridge switching circuit and is gated by the same 3 phase PWM data signals Uds, Vds and Wds from Controller 120. The 3 phase H-bridge switching circuit is illustrated in FIG. 8.

Current sensor 60 provides Phase 1 Ifu feedback of information including current from all three output UD1, UD2 and UD3. Therefore, Ifu is the sum of UD1, UD2 and UD3. Likewise current sensor 61 provides Phase 2 Ifv summation feedback of information including current from outputs VD1, VD2 and VD3. Typically, Ifw feedback can be calculated and would not require a hardware sensor.

Power Source 130 has a positive terminal 131 that is connected to Partition Drive Unit 1 (PD1) positive terminal 1. Power Source 130 has a negative terminal 132 that is connected to Partition Drive Unit 3 (PD3) negative terminal 6. Configuration Switch S1 has a positive terminal S1+ connected to Partition Drive Unit 1 (PD1) positive terminal 1 and a negative terminal S1− connected to Partition Drive Unit 2 (PD2) positive terminal 3. Configuration Switch S2 has a positive terminal S2+ connected to Partition Drive Unit 1 (PD1) negative terminal 2 and a negative terminal S2− connected to Partition Drive Unit 2 (PD2) positive terminal 3. Configuration Switch S3 has a positive terminal S3+ connected to Partition Drive Unit 2 (PD2) positive terminal 3 and a negative terminal S3− connected to Partition Drive Unit 3 (PD3) positive terminal 5. Configuration Switch S4 has a positive terminal S4+ connected to Partition Drive Unit 2 (PD2) negative terminal 4 and a negative terminal S4− connected to Partition Drive Unit 3 (PD3) positive terminal 5. Configuration Switch S5 has a positive terminal S5+ connected to Partition Drive Unit 1 (PD1) negative terminal 2 and a negative terminal S5− connected to Partition Drive Unit 3 (PD3) negative terminal 6. Configuration Switch S6 has a positive terminal S6+ connected to Partition Drive Unit 2 (PD2) negative terminal 4 and a negative terminal S6− connected to Partition Drive Unit 3 (PD3) negative terminal 6.

Figure 5:
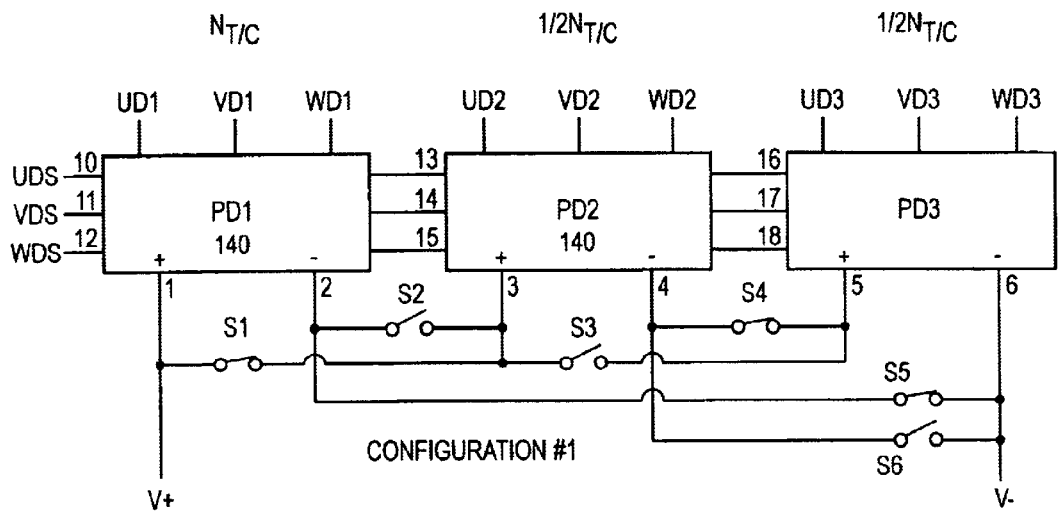
FIG. 5 is a schematic diagram of the switch settings to the input of the split drive units in accordance with Configuration #1.

FIG. 5 shows the Configuration Switch settings for Configuration #1. Configuration Switch S1 is closed supplying positive drive voltage from positive terminal 131 to Partition Drive Unit 2 (PD2) positive power terminal 3. Configuration Switch S4 is closed to connect the negative terminal 4 of Partition Drive Unit 2 (PD2) to Partition Drive Unit 3 (PD3) positive power terminal 5. Configuration Switch S5 is closed to connect the negative terminal 2 of Partition Drive Unit 1 (PD1) to the negative drive voltage from negative terminal 132. Configuration switches S2, S3 and S6 are open.

Based upon the switch settings in Configuration #1, the Partition Drive Unit 2 (PD2) is in series with Partition Drive Unit 3 (PD3) to the supply voltages 131 and 132 from power source 130. Partition Drive Unit 1 (PD1) is set to receive the full supply voltage to the windings. With the windings in Partition Drive Units 2 (PD2) and Partition Drive Unit 3 (PD3) being essentially in series to the supply voltage and each having one half the number (N) of turns per coil (t/c) of Partition Drive Unit 1 (PD1) or, in the equation of, (½ Nt/c), the result is a total number of turns per coil of 1.0 Nt/c. With the windings of Partition Drive Unit 1 (PD1) having a number of turns per coil of 1.0 Nt/c and being essentially in parallel with Partition Drive Unit 2 (PD2) and Partition Drive Unit 3 (PD3), the result is a total number of turns per coil of 1.0 Nt/c.

Figure 6:
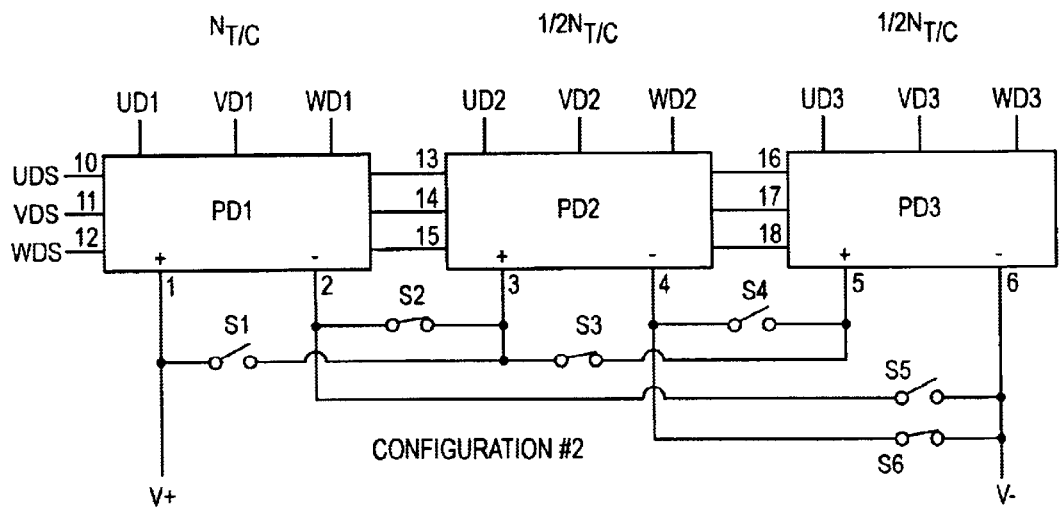
FIG. 6 is a schematic diagram of the switch settings to the input of the split drive units in accordance with Configuration #2.

FIG. 6 shows the Configuration Switch settings for Configuration #2. Configuration Switch S2 is closed connecting the negative supply terminal 2 of Partition Drive Unit 1 (PD1) to the positive power terminal 3 Partition Drive Unit 2 (PD2). Configuration Switch S3 is closed to connect the positive terminal 3 of Partition Drive Unit 2 (PD2) to the positive power terminal 5 of Partition Drive Unit 3 (PD3). Configuration Switch S6 is closed to connect the negative terminal 4 of Partition Drive Unit 2 (PD2) to the negative drive voltage from negative terminal 132. Configuration switches S1, S4 and S5 are open.

Based upon the switch settings in Configuration #2, the Partition Drive Unit 1 (PD1) is in series with Partition Drive Unit 2 (PD2) to the supply voltages 131 and 132 from power source 130. Partition Drive Unit 2 (PD2) is in parallel with Partition Drive Unit 3 (PD3). With the windings in Partition Drive Unit 2 (PD2) and Partition Drive Unit 3 (PD3) being essentially in parallel and each having one half the number (N) of turns per coil (t/c) of Partition Drive Unit 1 (PD1) or, in the equation of, (½ Nt/c), the result is a total number of turns per coil of ½ Nt/c. With the windings of Partition Drive Unit 1 (PD1) having a number of turns per coil of 1.0 Nt/c and being essentially in series with Partition Drive Unit 2 (PD2) and Partition Drive Unit 3 (PD3), the result is a total number of turns per coil of 1.5 Nt/c.

Figure 7:
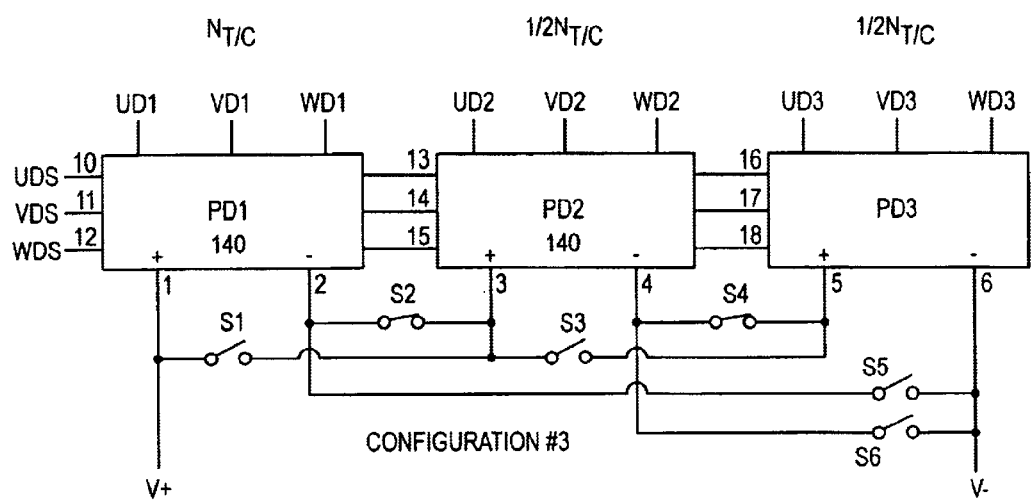
FIG. 7 is a schematic diagram of the switch settings to the input of the split drive units in accordance with Configuration #3.

FIG. 7 shows the Configuration Switch settings for Configuration #3. Configuration Switch S2 is closed connecting the negative supply terminal 2 of Partition Drive Unit 1 (PD1) to the positive power terminal 3 Partition Drive Unit 2 (PD2). Configuration Switch S4 is closed to connect the negative terminal 4 of Partition Drive Unit 2 (PD2) to the positive power terminal 5 of Partition Drive Unit 3 (PD3). Configuration switches S1, S3, S5 and S6 are open.

Based upon the switch settings in Configuration #3, the Partition Drive Unit 1 (PD1) is in series with Partition Drive Unit 2 (PD2) to the supply voltages 131 and 132 from power source 130. Partition Drive Unit 2 (PD2) is in series with Partition Drive Unit 3 (PD3). With the windings in Partition Drive Unit 2 (PD2) and Partition Drive Unit 3 (PD3) being essentially in series and each having one half the number (N) of turns per coil (t/c) of Partition Drive Unit 1 (PD1) or, in the equation of, (½ Nt/c), the result is a total number of turns per coil of 1.0 Nt/c. With the windings of Partition Drive Unit 1 (PD1) having a number of turns per coil of 1.0 Nt/c and being essentially in series with Partition Drive Unit 2 (PD2) and Partition Drive Unit 3 (PD3), the result is a total number of turns per coil of 2.0 Nt/c.

As a result, Configuration #1 will have an effective number of turns per coil equal to 1.0 Nt/c, Configuration #2 will have an effective number of turns per coil equal to 1.5 Nt/c, and Configuration #3 will have an effective number of turns per coil equal to 2.0 Nt/c. As a change in the number of turns per coil will result in a proportional change in the corner frequency of the efficiency curve and a change in torque load will also result in a proportional change in the efficiency curve, a change in the number of turns per coil enables the efficient adjustment of the change in the efficiency caused by the changes in torque load. Thus, as illustrated in Configurations #1-#3, the variations in switch settings permit the Partition Drive Units to be connected in either series or parallel combinations to enable the effective number of turns per coil of the apparatus to be increased or decreased and, thereby, compensate for the changes in torque load while providing increased motor efficiency.

For example, if Partition Drive Unit 1 (PD1) has Nt/c or ten (10) turns per coil and Partition Drive Unit 2 (PD2) and Partition Drive Unit 3 (PD3) has ½ Nt/c or five (5) turns per coil, Configuration #1 would have ten (10) effective turns per coil, Configuration #2 would have fifteen (15) effective turns per coil, and Configuration #3 would have twenty (20) effective turns per coil. With an effective turns per coil often (10), Configuration #1 would provide higher efficiency at higher torque levels such as when the vehicle is accelerated from any constant speed or, in other words, from a cruising speed to pass another vehicle. As Configuration #1 with ten (10) turns per coil would not be as efficient at low torque levels, Configuration #3 would be used as twenty (20) effective turns per coil to provide a higher efficiency at low torque levels such as when the vehicle is accelerated from the start or, in other words, from a relatively slow or stopped position. With the on-command variable torque control, the unique stator construction enables the effective number of turns per coil to be adjusted to achieve increased efficiency based upon the torque loads generated from the motor in response to the situation of the vehicle.

Alternatively, the stator may have any number of Partition Drive Units or Partition Drives. The Partition Drive Units may be connected in either series or parallel combinations to enable the effective number of turns per coil of the apparatus to be increased or decreased so long the Partition Drive Units have either a number of turns per coil of 1.0 Nt/c or ½ Nt/c in relation to the other Partition Drive Units, with N being any number of turns per coil. If the Partition Drive Units are to be combined in parallel, the Partition Drive Units should contain the same number of turns per coil.

A microprocessor-based controller 120 (FIG. 3A) includes a central processing unit and program memory in order to generate the three (3) phase drive signals on lines Uds, Vds, and Wds to energize the winding drive circuits PD1, PD2, and PD3. A rotational speed sensor 122 is provided to detect the rotational speed of the electric motor which is fed back to the controller 120 through line 121. Current feedback is provided by a current sensor 60 and 61 for Phase 1 and Phase 2. Based upon the feedback information, the controller 120 can generate the necessary pulse width modulation signals Uds, Vds and Wds to generate the desired rotational speed and torque of the rotor 50. With additional gathered data such as miles per hour, revolutions per minute, and throttle lever, the controller 120 can also determine the current drive efficiency and change the state of the configuration switches S1–S6 to maintain the highest possible efficiency.

In an alternate embodiment of the invention, two or more stators may be mounted and spaced axially from one another on essentially the same mechanical shaft. One stator could comprise the split Partitioned Windings MP1 as disclosed above while the second stator could comprise the split Partitioned Windings MP2 and likewise with the additional stators. Each set of Partitioned Windings MP1 through MP3 could be similarly controlled as disclosed above and their Partitioned drivers PD1, PD2, and PD3 could be switched with Configuration switches S1 through S6 as detailed above.

Thus, there has been provided an improved electric motor which includes a unique stator construction to enable variable torque control over an infinite range of operating speeds. This unique stator constructions compensates for the loss of efficiency that is caused by changes in motor torque load and, thereby, maintains a high system efficiency to reduce power consumption and increase vehicle mileage.

While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. An electric motor for generating varying amounts of output torque supplied to a driven member at any constant revolution per minute speed for reducing power consumption on the power source, comprising:

a rotor having an axis of rotation;

a stator assembly disposed around said rotor and being inductively coupled to said rotor;

said stator assembly having at least one stator phase;

said stator phase having at least two stator poles;

each of said stator poles having at least two split windings, each of said split windings being wound such that the magnetic flux generated in all said split windings will add to produce an increased magnetic field strength;

each of said split windings within each of said stator poles being wired into an electrical configuration with associated split windings of similar stator poles for forming at least two partitioned drive circuits;

controller means being coupled to each of said partitioned drive circuits for varying the duty cycle of voltage pulses defining a pulse-width modulated waveform;

each of said partitioned drives circuits forming a plurality of transistors connected in an H-bridge network across a power source, said plurality of transistors being turned on and off for producing said voltage pulses with alternating polarity and predetermined width;

the at least two partitioned drives having independent power source input terminals, each of said power source input terminals of each partitioned drive having at least three independently controlled direct current switching circuits;

each of said controlled switching circuits being configured for allowing each of said partitioned drives to be switched into parallel or series combinations with the other of said partitioned drives for regulating the effective number of turns per coil of said stator for increased efficiency based upon the output torque generated from said electric motor.

2. The electric motor of claim 1 wherein the number of said stator phases is three.

3. The electric motor of claim 1 wherein the number of said stator poles is four.

4. The electric motor of claim 1 wherein the number of said split windings is three.

5. The electric motor of claim 1 wherein the number of said partitioned drive circuits is three.

6. The electric motor of claim 1 wherein said controller means is an inverter controller.

7. The electric motor of claim 1 wherein said voltage pulses defining the pulse-width modulated waveform is alternating current.

8. The electric motor of claim 1 wherein said power source is a battery.

9. The electric motor of claim 1 wherein said partitioned drives are wired into either a wye or Y configuration.

10. An electric motor for generating varying amounts of output torque supplied to a driven member at any constant revolution per minute speed for reducing power consumption on the power source, comprising:

a rotor having an axis of rotation;

a stator assembly disposed around said rotor and being inductively coupled to said rotor;

said stator assembly having a plurality of stator phases;

said stator phase having a plurality of stator poles;

each of said stator poles having a plurality of split windings, each of said split windings being wound such that the magnetic flux generated in all said plurality of split windings will add to produce an increased magnetic field strength;

each of said plurality of split windings within each of said plurality of stator poles being wired into an electrical configuration with associated split windings of similar stator poles for forming a plurality of partitioned drive circuits;

controller means being coupled to each of said plurality of partitioned drive circuits for varying the duty cycle of voltage pulses defining a pulse-width modulated waveform;

each of said plurality of partitioned drives circuits forming a plurality of transistors connected in an H-bridge network across a power source, said plurality of transistors being turned on and off for producing said voltage pulses with alternating polarity and predetermined width;

the plurality of partitioned drives having independent power source input terminals, each of said power source input terminals of each partitioned drive having independently controlled direct current switching circuits;

each of said controlled switching circuits being configured for allowing each of said partitioned drives to be switched into parallel or series combinations with the other of said partitioned drives for regulating the effective number of turns per coil of said stator for increased efficiency based upon the output torque generated from said electric motor.

11. The electric motor of claim 10 wherein said plurality of stator phases is three.

12. The electric motor of claim 10 wherein said plurality of stator poles is four.

13. The electric motor of claim 10 wherein said plurality of split windings is three.

14. The electric motor of claim 10 wherein said plurality of partitioned drive circuits is three.

15. The electric motor of claim 10 wherein said controller means is an inverter controller.

16. The electric motor of claim 10 wherein said voltage pulses defining the pulse-width modulated waveform is alternating current.

17. The electric motor of claim 10 wherein the number of said independently controlled switching circuits is six.

18. An electric motor for generating varying amounts of output torque supplied to a driven member at any constant revolution per minute speed for reducing power consumption on the power source, comprising:

a rotor having an axis of rotation;

a stator assembly disposed around said rotor and being inductively coupled to said rotor;

said stator assembly having three stator phases;

said stator phase having four stator poles;

each of said stator poles having three split windings, each of said split windings being wound such that the magnetic flux generated in all said split windings will add to produce an increased magnetic field strength;

each of said split windings within each of said stator poles being wired into an electrical configuration with associated split windings of similar stator poles for forming three partitioned drive circuits;

an inverter controller coupled to each of said partitioned drive circuits for varying the duty cycle of voltage pulses defining a pulse-width modulated waveform;

each of said partitioned drives circuits forming a plurality of transistors connected in an H-bridge network across a battery source, said plurality of transistors being turned on and off for producing said voltage pulses with alternating polarity and predetermined width;

the three partitioned drives having independent power source input terminals, each of said power source input terminals of each partitioned drive having six independently controlled direct current switching circuits;

each of said controlled switching circuits being configured for allowing each of said partitioned drives to be switched into parallel or series combinations with the other of said partitioned drives for regulating the effective number of turns per coil of said stator for increased efficiency based upon the output torque generated from said electric motor.

* * * * *